United States Patent
Huang et al.

(10) Patent No.: US 8,170,865 B2
(45) Date of Patent: May 1, 2012

(54) SPEECH RECOGNITION DEVICE AND METHOD THEREOF

(75) Inventors: Liang-Sheng Huang, Taipei (TW); Chao-Jen Huang, Taipei (TW); Jia-Lin Shen, Taipei (TW)

(73) Assignee: DELTA Electronics, Inc., Taoyuan Hsien (TW)

( * ) Notice: Subject to any disclaimer, the term of this patent is extended or adjusted under 35 U.S.C. 154(b) by 897 days.

(21) Appl. No.: 12/211,621

(22) Filed: Sep. 16, 2008

(65) Prior Publication Data

US 2009/0182561 A1    Jul. 16, 2009

(30) Foreign Application Priority Data

Jan. 10, 2008  (TW) ................................ 97100993 A

(51) Int. Cl.
*G10L 15/00* (2006.01)
(52) U.S. Cl. .............................. 704/8; 704/251; 704/257
(58) Field of Classification Search .............. 704/8, 251, 704/257
See application file for complete search history.

(56) References Cited

U.S. PATENT DOCUMENTS

| | | | |
|---|---|---|---|
| 5,787,230 A * | 7/1998 | Lee | 704/235 |
| 6,067,520 A * | 5/2000 | Lee | 704/270 |
| 6,163,767 A | 12/2000 | Tang et al. | |
| 2004/0215465 A1* | 10/2004 | Lee | 704/277 |
| 2006/0173685 A1* | 8/2006 | Huang et al. | 704/254 |

FOREIGN PATENT DOCUMENTS

CN        1120436 C      9/2003

* cited by examiner

*Primary Examiner* — Daniel D Abebe
(74) *Attorney, Agent, or Firm* — J.C. Patents

(57) ABSTRACT

A speech recognition device and a method thereof are adapted to recognize a Chinese word. The speech recognition device includes a lexicon model, a language model, a speech recognition module, and a parsing module. The lexicon model keeps a plurality of words. The speech recognition module performs a speech recognition processing on a voice signal conforming to a syntax structure of Chinese word description. The speech recognition processing searches words related to the Chinese word description from the lexicon model according to a feature of the Chinese word description, and produces a literal word series in digital data form by referring a syntax combination probability. The language model based on the syntax structure of Chinese word description provides the syntax combination probability according to combination relations between the searched words. The parsing module analyzes the syntax structure of the literal word series for retrieving the Chinese word.

12 Claims, 2 Drawing Sheets

SPEECH RECOGNITION DEVICE AND METHOD THEREOF

CROSS-REFERENCE TO RELATED APPLICATION

This application claims the priority benefit of Taiwanese application serial no. 97100993, filed on Jan. 10, 2008. The entirety of the above-mentioned patent application is hereby incorporated by reference herein and made a part of this specification.

BACKGROUND OF THE INVENTION

1. Field of the Invention

The present invention relates to a speech recognition device and a method thereof, and more particular, to a device using a Chinese word description to recognize a Chinese word and a method thereof.

2. Description of Related Art

Along with the progress of electronic technology, and prevailing of wireless communication and Internet, portable devices with "light, thin, short, and small" design have gradually become a new-generation platform for accessing information. However, not all the devices are provided with input/output devices such as screens, keyboards, or mousse that people are familiar with. Therefore, in the future, human-machine interface between human beings and smart equipments may be controlled by voice, which is the most natural and convenient way for making communications. Furthermore, in daily life, more and more multimedia audio and visual information may be acquired, and if the voice information can be converted into words while the multimedia audio and visual information is played, users can quickly grasp the theme and ideas conveyed therein. However, the accuracy in speech recognition is quite important no matter in terms of voice control or conversion of voice into words.

A conventional Chinese speech recognizer substantially includes a front-end processor, a lexicon database, an acoustic model, and a language model. When a voice signal is received, the front-end processor retrieves a voice frame of the voice signal, and obtains a feature helpful for speech recognition from the voice frame, e.g., Mel-frequency cepstral coefficient (MFCC). The acoustic model is generally a hidden Markov model (HMM) taking phoneme, syllable, or word as a unit, for comparing the above feature with the established acoustic model to determine the sound of the voice frame of the voice signal. Then, some Chinese words probably corresponding to this sound are searched from the lexicon database in a way similar as looking up a dictionary. In the meanwhile, the language model determines which one of the searched Chinese words is the most proper one in the sentence through probability and statistics. In this manner, the Chinese words corresponding to the voice signal are recognized.

U.S. Pat. No. 6,163,767 has disclosed a speech recognition method and system for recognizing an isolated or un-correlated Chinese character. FIG. 1 is a schematic view of a conventional speech recognition system. Referring to FIG. 1, the speech recognition system includes a speech recognizer 110 based on the Chinese character description, a grammar analyzer 120 based on the Chinese character description, and a Chinese character generator 130. The speech recognizer 110 differs from the conventional speech recognizer in that, the language model of the speech recognizer 110 is further provided with one language model based on the Chinese character description.

As disclosed in this patent, the syntax rules of the Chinese character description are established in the language model. When the speech recognizer 110 receives a Chinese character description, e.g. "tai2 tou2 de5 tai2 (抬頭的抬)", and recognizes the Chinese characters included in the Chinese character description one by one, the language model based on the Chinese character description compares and determines the syntax rules of the recognized Chinese character description, e.g. "tai2 tou2 de5 tai2 (抬頭的抬)" belongs to a syntax rule of "a Chinese word+de5 (的)+a Chinese character", thereby recognizing the input Chinese character is "tai2 (抬)".

In Chinese, a word is composed of at least one Chinese character, a sentence is composed of at least one word, and a paragraph is composed of at least one sentence. If the Chinese words or sentences input by the user are recognized one by one in Chinese characters according to the above patent, the time spent for recognizing is rather long. For example, when a Chinese word "yang2 ming2 shan1 (陽明山)" is inputted, "tai4 yang2 de5 yang2 (太陽的陽)", "ming2 tian1 de5 ming2 (明天的明)", and "gao1 shan1 de5 shan1 (高山的山)" are taken as the Chinese character descriptions for recognizing the correct Chinese characters.

In addition, in the field of Chinese speech recognition technique, the recognition of an isolated word is quite important. Generally, all the words are collected to build a lexicon for recognition, but the larger the lexicon is, the higher ambiguity it may cause. Since the recognition of the isolated word is not made based on the context, the isolated words with similar pronunciations, such as "da4 dao4 (大道)", "da4 dao4 (大盜)", and "da3 dao3 (打倒)", or the isolated words with a short word length may easily result in recognition errors.

SUMMARY OF THE INVENTION

The present invention provides a speech recognition device and a method thereof, in which a Chinese word description is used to recognize a Chinese word, so as to improve the recognition accuracy and reduce the time spent in recognizing a Chinese word.

The present invention provides a speech recognition device adapted to recognize a Chinese word, which includes a lexicon model, a speech recognition module, a language model, and a parsing module. The Chinese word is composed of a plurality of Chinese characters. The lexicon model keeps a plurality of words, and each word is composed of at least one Chinese character. The speech recognition module performs a speech recognition processing on a voice signal that conforms to a syntax structure of a Chinese word description, and produces a literal word series in digital data form. The speech recognition processing searches the words related to the Chinese word description from the lexicon model according to a feature of the Chinese word description, and produces a suitable literal word series by referring a syntax combination probability. During the speech recognition process, the language model based on the syntax structure of a Chinese word description provides the referred syntax combination probability according to the connection relations between the searched words. The parsing module analyzes a syntax structure of the literal word series for retrieving a Chinese word.

The present invention provides a speech recognition method adapted to recognize a Chinese word composed of a plurality of Chinese characters. First, a voice signal that conforms to a syntax structure of a Chinese word description is received, and a speech recognition processing is performed on the voice signal. Here, the speech recognition processing searches the words related to the Chinese word description from a plurality of words according to a feature of the Chinese word description, and produces a literal word series in digital data form according to the connection relations between the searched words. Each the said word is composed of at least one Chinese character. Then, a syntax structure of a literal word series is analyzed for retrieving a Chinese word.

The present invention adopts a feature of the Chinese word description and a syntax combination probability provided by the language model to serve as the constraints in searching words during the speech recognition processing, so as to reduce the time and improve the accuracy in recognizing a Chinese word.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
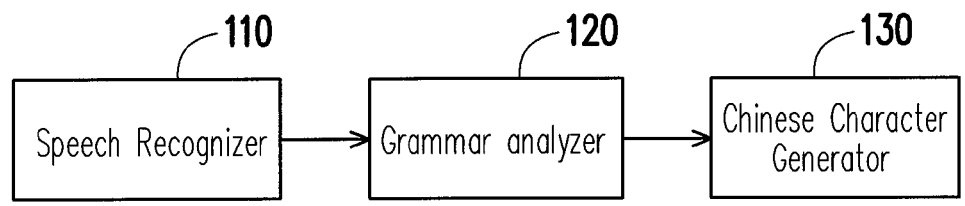
FIG. 1 is a schematic view of a conventional speech recognition system.

Reference will now be made in detail to the present preferred embodiments of the invention, examples of which are illustrated in the accompanying drawings. Wherever possible, the same reference numbers are used in the drawings and the description to refer to the same or like parts.

Figure 2:
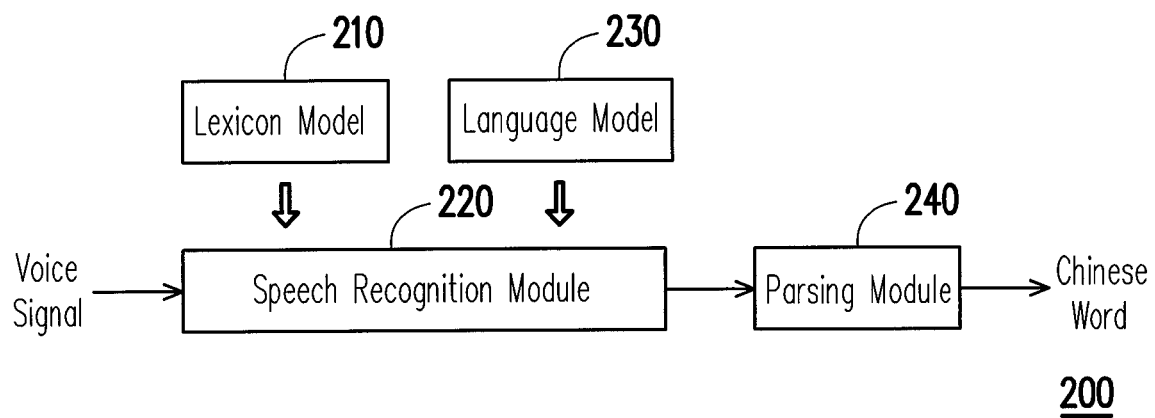
FIG. 2 is a block diagram of a speech recognition device according to an embodiment of the present invention.

FIG. 2 is a block diagram of a speech recognition device according to an embodiment of the present invention. Referring to FIG. 2, a speech recognition device 200 includes a lexicon model 210, a speech recognition module 220, a language model 230, and a parsing module 240. The speech recognition device 200 recognizes a sentence formed by a plurality of Chinese words. First, the speech recognition device 200 receives a voice signal that conforms to a syntax structure of a Chinese word description. In this embodiment, the Chinese word description has a feature, e.g., any description about pictograph, pronunciation, or meaning for any Chinese character of a Chinese word, or initial letters of pinyin, tones for the Chinese characters of a Chinese word, or a word length, or part of speech of the Chinese word.

The lexicon model 210 keeps a plurality of words and all acoustic models for recognizing a Chinese word. Each word includes at least one Chinese character. When the speech recognition module 220 performs a speech recognition processing on a voice signal, it searches the words related to the Chinese word description from the lexicon model 210 according to the feature of the Chinese word description. The language model 230 provides a syntax combination probability according to the connection relations between the searched words to the speech recognition module 220 for aiding the speech recognition module 220 in searching words. The language model 230 of this embodiment is obtained through training with the corpus of Chinese word description, and is used to provide a score to the combination between the adjacent searched words to the speech recognition module 220. Thus, the speech recognition module 220 obtains the suitable literal word series based on the constraint provided by the language model 230. The literal word series are the results obtained after being converted from the analog voice signal into the digital word signal, which also conforms to the syntax structure of a Chinese word description. The parsing module 240 analyzes the syntax structure of the literal word series for retrieving a Chinese word.

For example, when a Chinese word "guo2 li4 (國立)" is intended to be input via voice "guo2 li4", the speech recognition module 220 may output various recognition results, e.g., "guo2 li4 (國立)", "guo2 li4 (國曆)", "guo3 li4 (果粒)", or "guo2 li4 (國力)", wherein the said exemplary Chinese words have similarly tone, but they have different meanings and each of them has at least one character different to others. If a description about a pictograph for one Chinese character of the Chinese word is provided, and the syntax structure of the Chinese word description may be "a Chinese word 1+de5 (的)+a Chinese character+a Chinese word 2". When a voice signal, e.g., "zhan4 li4 (站立) de5 (的) li4 (立) guo2 li4 (國立)" that conforms to the syntax structure of the Chinese word description is input via voice, the speech recognition module 220 may search the words, e.g., "zhan4 li4 (站立)", "de5 (的)", "li4 (立)", "li4 (利)", "guo2 li4 (國立)", "(國曆)", or "guo2 li4 (國力)" related to Chinese word description from the lexicon model 210.

Meanwhile, the language model 230 provides a syntax combination probability of the Chinese word description for the speech recognition module 220, such that the candidate words that conform to the Chinese word description may obtain a higher weight. Therefore, the words more closely related to the Chinese word description may be obtained, and the literal word series, i.e. "zhan4 li4 de5 li4 guo2 li4 (站立的立國立)" may be produced. The parsing module 240 analyzes a syntax structure of the literal word series produced by the speech recognition module 220, so as to retrieve a Chinese word "guo2 li4 (國立)". With the help of language model 230 that provides the constraints of adjacent searched words, the words in the format of legal Chinese word description are easier to be recognized.

In order to make people ordinary skill in the art can easily practice the present invention, another embodiment is illustrated. If the description about a pronunciation for one Chinese character of a Chinese word is provided, a syntax structure of the Chinese word description may also be "a pinyin of a Chinese character+a Chinese character+a Chinese word". Taking the Chinese word "yang2 ming2 shan1 (陽明山)" as an example, when a voice signal, e.g., "一大 yang2 (陽) yang2 ming2 shan1 (陽明山)" or "ㄇ一ㄥ ming2 (明) yang2 ming2 shan1 (陽明山)" that conforms to the syntax structure of the Chinese word description is input through voice, the speech recognition module 220 searches the words related to the Chinese word description from the lexicon model 210 according to the feature of the Chinese word description, and produces a literal word series based on the syntax combination probability provided by the language model 230. In this manner, the feature of the Chinese word description and the syntax combination probability provided by the language model are taken as the constraints in searching words during the speech recognition, thereby reducing the time and improving the accuracy in recognizing a Chinese word.

In view of the above, the feature of the Chinese word description may be any description about a pictograph, pronunciation, or meaning for one Chinese character of a Chinese word, or initial letters of pinyin, and tones for the Chinese characters of the Chinese word, or a word length, or part of speech of the Chinese word. Here, the process is illustrated through different types of the descriptions, in which the Chinese word "yang2 ming2 shan1 (陽明山)" is taken as an example for recognition.

First Type: the feature of the Chinese word description is a description about a pictograph for one Chinese character of a Chinese word, and a syntax structure of the Chinese word description may be "a specific word+the one Chinese character+the Chinese word". For example, the specific word is composed of traditionally recognized components of the Chinese character related to the one Chinese word and "ri4 yue4 (明) ming2 (明) yang2 ming2 shan1 (陽明山)" is exemplary, wherein ""ri4 yue4 (明)" is the specific word, "ming2 (明)" is the one Chinese character, and "yang2 ming2 shan1 (陽明山)" is the Chinese word".

Second Type: the feature of the Chinese word description is a description about a pronunciation for one Chinese character of a Chinese word, and a syntax structure of the Chinese word description may be "a first Chinese word+de5 (的)+the one Chinese character+the Chinese word" or "a pinyin of the one Chinese character+the one Chinese character+the Chinese word". The first Chinese word and the Chinese word may have different meanings, but the first Chinese word includes at least one Chinese character same as the one Chinese character. For example, "gao1 shan1 (高山) de5(的) shan1 (山) yang2 ming2 shan1 (陽明山)", wherein "gao1 shan1 (高山)" is the first Chinese word, "shan1 (山)" is the one Chinese character, and "yang2 ming2 shan1 (陽明山)" is the Chinese word. There is another example, "ㄕㄢ shan1 (山) yang2 ming2 shan1 (陽明山)", wherein "ㄕㄢ" is the pinyin of the one Chinese character, "shan1 (山)" is the one Chinese character, and "yang2 ming2 shan1 (陽明山)" is the Chinese word.

Third Type: the feature of the Chinese word description is a description about a meaning for one Chinese character of a Chinese word, and a syntax structure of the Chinese word description may be "a specific word+the one Chinese character+the Chinese word". Herein, the specific word represent the meaning for the one Chinese character. For example, "chao1 xi1 (朝曦) yang2(陽) yang2 ming2 shan1 (陽明山)", wherein "zhao1 xi1 (朝曦)" representing the sunlight is the meaning of the one Chinese character "yang2 (陽)" of the Chinese word "yang2 ming2 shan1 (陽明山)".

Fourth Type: the feature of the Chinese word description is initial letters of pinyin for Chinese characters of a Chinese word, and a syntax structure of the Chinese word description may be "an initial letter of pinyin for one Chinese character+ an initial letter of pinyin for another Chinese character+ . . . +the Chinese word", for example, "Y M S yang2 ming2 shan1 (陽明山)".

Fifth Type: the feature of the Chinese word description is tones for Chinese characters of a Chinese word, and a syntax structure of the Chinese word description may be "a tone+a tone+ . . . +the Chinese word", for example, "2 2 1 yang2 ming2 shan1 (陽明山)".

Sixth Type: the feature of the Chinese word description is a word length of a Chinese word, and a syntax structure of the Chinese word description may be "a quantifier+the Chinese word", for example, "three characters (三字詞) yang2 ming2 shan1 (陽明山)".

Seventh Type: the feature of the Chinese word description is a part of speech of a Chinese word, and a syntax structure of the Chinese word description may be "a part of speech+the Chinese word", for example, "noun (名詞類) yang2 ming2 shan1 (陽明山)".

Figure 3:
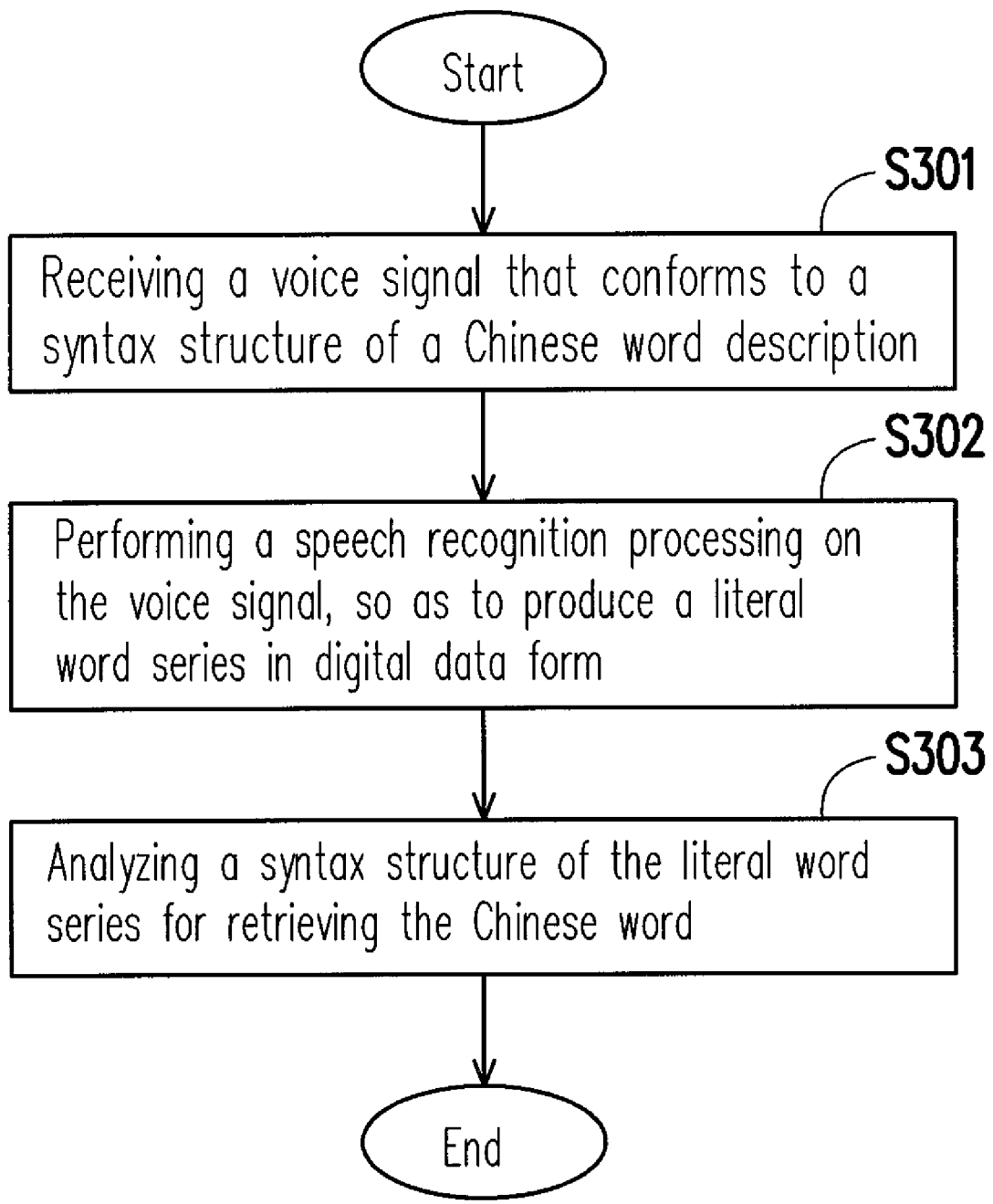
FIG. 3 is a process flow of a speech recognition method according to an embodiment of the present invention.

The process flow of the method of the present invention is summarized below from the descriptions of the above embodiments. FIG. 3 is a process flow of a speech recognition method according to an embodiment of the present invention. Referring to FIG. 3, in step S301, a voice signal that conforms to a syntax structure of a Chinese word description is received, and a speech recognition processing is performed on the voice signal in step S302. The speech recognition processing searches the words related to the Chinese word description from a plurality of words according to a feature of the Chinese word description, and produces a literal word series in digital data form according to the connection relations between the searched words. Here, the Chinese word description has a feature, e.g., a description about a pictograph, pronunciation, or meaning for Chinese characters of a Chinese word, or initial letters of pinyin, tones for Chinese characters of the Chinese word, or a word length, or part of speech of the Chinese word. Then, the syntax structure of the literal word series is farther analyzed for retrieving a Chinese word in step S303.

In summary, according to the embodiments of the present invention, during the speech recognition processing, the Chinese-word-description-based language model is employed to constrain the words to be searched, so as to reduce the time and improve the accuracy in recognition. The embodiments of the present invention have improved accuracy in recognizing a Chinese word as compared with the conventional method of establishing a lexicon database for recognizing an isolated Chinese word without a context (or referred to as a Chinese word). Furthermore, the embodiments of present invention recognize Chinese words one by one, thereby reducing the time in recognizing Chinese words.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A speech recognition device, adapted to recognize a Chinese word composed of a plurality of Chinese characters, comprising:
   a lexicon model, keeping a plurality of words, wherein each word is composed of at least one Chinese character;
   a speech recognition module, performing a speech recognition processing on a voice signal that conforms to a syntax structure of a Chinese word description, wherein the speech recognition processing searches words related to the Chinese word description from the lexicon model according to a feature of the Chinese word description, and produces a literal word series in digital data form by referring a syntax combination probability;
   a language model, based on the syntax structure of the Chinese word description for providing the referred syntax combination probability according to the connection relations between the searched words; and
   a parsing module, analyzing a syntax structure of the literal word series, and retrieving the Chinese word from the literal word series.

2. The speech recognition device according to claim 1, wherein the feature is any description about pictograph, pronunciation, or meaning for any Chinese character of the Chinese word.

3. The speech recognition device according to claim 1, wherein the feature is initial letters of pinyin for the Chinese characters of the Chinese word.

4. The speech recognition device according to claim 1, wherein the feature is tones for the Chinese characters of the Chinese word.

5. The speech recognition device according to claim 1, wherein the feature is a word length of the Chinese word.

6. The speech recognition device according to claim 1, wherein the feature is a part of speech of the Chinese word.

7. A speech recognition method, adapted to recognize a Chinese word composed of a plurality of Chinese characters, comprising:

receiving a voice signal that conforms to a syntax structure of a Chinese word description;

performing a speech recognition processing on the voice signal to produce a literal word series in digital data form, wherein the speech recognition processing searches the words related to the Chinese word description from a plurality of words according to a feature of the Chinese word description, and produces the literal word series according to the connection relations between the searched words; and analyzing a syntax structure of the literal word series for retrieving a Chinese word.

8. The speech recognition method according to claim 7, wherein the feature is any description about pictograph, pronunciation, or meaning for any Chinese character of the Chinese word.

9. The speech recognition method according to claim 7, wherein the feature is initial letters of pinyin for the Chinese characters of the Chinese word.

10. The speech recognition method according to claim 7, wherein the feature is tones for the Chinese characters of the Chinese word.

11. The speech recognition method according to claim 7, wherein the feature is a word length of the Chinese word.

12. The speech recognition method according to claim 7, wherein the feature is a part of speech of the Chinese word.

\* \* \* \* \*